United States Patent [19]

Tapley

[11] Patent Number: 4,726,142
[45] Date of Patent: Feb. 23, 1988

[54] SPRING LOADED FISH HOOK ASSEMBLY

[76] Inventor: William Tapley, Woodhull St., Forestport, N.Y. 13338

[21] Appl. No.: 924,312

[22] Filed: Oct. 29, 1986

[51] Int. Cl.⁴ .............................................. A01K 83/02
[52] U.S. Cl. .............................................. 43/36
[58] Field of Search .................... 43/36, 34, 35, 89

[56] References Cited

U.S. PATENT DOCUMENTS

| | | | |
|---|---|---|---|
| 684,211 | 10/1901 | Ferch | 43/36 |
| 2,403,202 | 7/1946 | Woodward | 43/35 |
| 2,415,633 | 2/1947 | Hietala | 43/35 |
| 2,608,786 | 9/1952 | Schwartz | 43/36 |
| 2,722,078 | 11/1955 | Nikota | 43/36 |
| 2,856,722 | 10/1958 | Byhre | 43/36 |
| 2,971,285 | 2/1961 | Murawski | 43/35 |

Primary Examiner—Gene P. Crosby
Attorney, Agent, or Firm—Charles S. McGuire

[57] ABSTRACT

A spring-loaded, double-acting fish hook having a pair of oppositely directed barbed hooks at the ends of a pair of legs of a spring member. The spring is disclosed as of the safety pin type, bent in a loop at its midpoint and having a catch on one leg engageable by a latch pivotally mounted on the other leg to maintain the spring in a flexed position with the hooks overlapping one another. Pressure on a trigger arm extending integrally from the latch to a position closely adjacent one of the hooks releases the latch, allowing the biasing force of the spring to move the legs, and thus the hooks, in opposite directions.

4 Claims, 3 Drawing Figures

SPRING LOADED FISH HOOK ASSEMBLY

BACKGROUND OF THE INVENTION

The present invention relates to fish hook assemblies and, more specifically, to a latching, spring loaded, double-acting fish hook.

Three of the most common problems encountered with conventional fishing lures and hooks are weeds collecting on the hook, visibility of the hooks on ordinary lures, and failure of the hook to set firmly in the fish's mouth. Many forms of so-called "weedless" hooks have been devised to address the former problem, usually involving the addition of further hardware to prevent the end of the hook from picking up plants and other foreign matter as it is pulled through the water. Some types of lures are configured to conceal the hook or hooks, so as not to detract from the natural appearance of the lure, particularly where it is intended to simulate a form of animal life upon which fish feed. In order to provide a "self-setting" hook, assemblies have been provided with a pair of hooks movable under the influence of a spring to an open position in response to a fish striking the lure.

Of the latter type of hook assemblies, some are designed to snap open in response to a fish biting the hooks to release a connecting latch, examples of which are found in U.S. Pat. Nos. 456,776, 1,283,174, 2,856,722 and 4,387,528. Other such hook assemblies spring open in response to a pull on the line by the fisherman after a fish strikes the hook, such as those of U.S. Pat. Nos. 44,368, 51,651, 712,497, 835,639, 2,209,300, 2,223,946, 2,608,786, 2,746,199, 2,982,047, 3,241,260, 3,986,289 and 4,186,509. Another type of snap-open hook assembly is that which opens in response to the fish moving a trigger to release a spring as it takes the lure, examples of this type of assembly being found in U.S. Pat. Nos. 684,211, 1,381,003 and 1,591,640.

It is a principal object of the present invention to provide an improved spring-loaded, snap-open fish hook assembly which is actuated by movement of a trigger arm to cause a pair of hooks to move in opposite directions to engage both the upper and lower parts the fish's mouth.

A further object is to provide a self-setting fish hook assembly of the foregoing type which also has the advantages of being weedless and lends itself to lure constructions wherein the hooks are well concealed.

Another object is to provide a fish hook assembly combining the features of a self-setting, weedless, concealed hook lure which is simple in operation, durable in use and economical in manufacture.

Other objects will in part be obvious and will in part appear hereinafter.

SUMMARY OF THE INVENTION

In accordance with the foregoing objects, the present invention is embodied in a fish-hook assembly having a pair of barbed hooks at opposite ends of a strand of spring wire which is bent in a loop at its midpoint to form a safety-pin type spring. The spring is releasably maintained in a flexed position with the hooks overlapping one another by means of a trigger arm pivotally attached to one of the spring legs and having a latching portion engageable with a catch on the opposite spring leg. The trigger arm extends in outwardly adjacent relationship to the curved portion of one of the hooks, and movement toward the hook releases the latching portion of the trigger arm from the catch, thus allowing the hooks to move apart under the force of the spring.

The overlapping relation of the hooks while the spring is in the flexed position, prior to being released by the strike of a fish, renders the assembly essentially weedless. The configuration of the assembly, as explained later, permits a wide variety of lure formations to be incorporated therewith while concealing the hooks. Furthermore, the snap-open action of the assembly causes the hooks to move quickly and forcefully into engagement with both upper and lower portions of the fish's mouth, thus providing a self-setting action.

DETAILED DESCRIPTION

Figure 1:
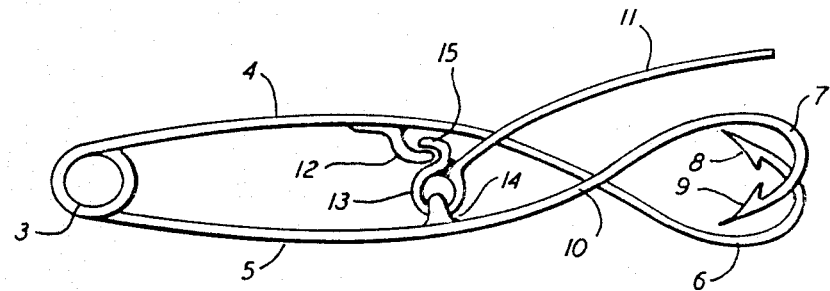
FIG. 1 is a side elevational view of the hook assembly in the flexed or cocked position.
Figure 2:
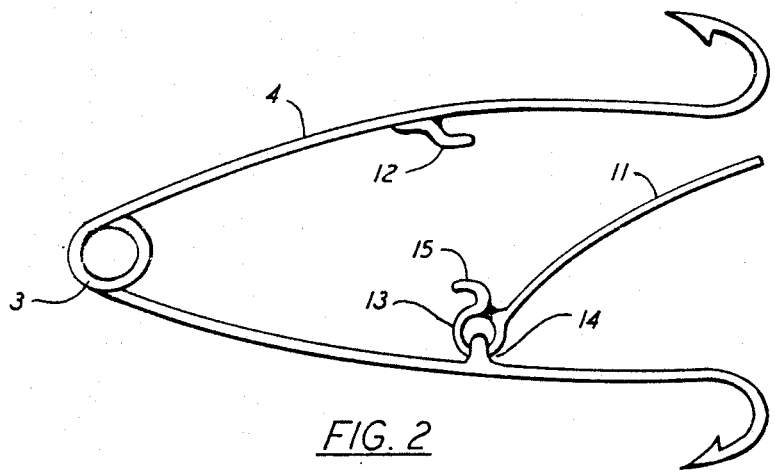
FIG. 2 shows the hook assembly of FIG. 1 in the unflexed or open position.

Referring now to the drawing, the fish hook assembly is shown in a preferred embodiment wherein a single strand of spring wire is bent at its midpoint to form a loop 3 with legs 4 and 5 extending therefrom to terminal ends which are bent at 6 and 7 to form a pair of hooks with barbed ends 8 and 9. The characteristics of the wire and manner of bending are such that the hook assembly is movable between the flexed and unflexed positions of FIGS. 1 and 2, respectively, in the nature of a safety pin. That is, legs 4 and 5 are spaced by a substantial distance in the natural or unflexed position assumed by the spring.

The hook assembly may be moved to a flexed position by pressing legs 4 and 5 toward one another with the thumb and forefinger of one hand. The configuration of legs 4 and 5 is such that they cross at point 10 when in the flexed position. The legs are maintained in this position by means of trigger arm 11 which is pivotally attached to leg 5 for engagement with catch member 12 on leg 4. Trigger arm 11 extends from one side of loop 13, which loosely passes through eye 14 on leg 5, and latch 15 extends from the opposite side. The length and configuration of trigger arm 11 are such that the arm lies outwardly adjacent curved hook portion 7 of leg 5 when the assembly is in the cocked position. Thus, any pressure on trigger arm 11 causing it to move toward curved portion 7 will release latch 15 from catch member 12, allowing the spring force to move legs 4 and 5 quickly and forcefully to the position of FIG. 2.

Figure 3:
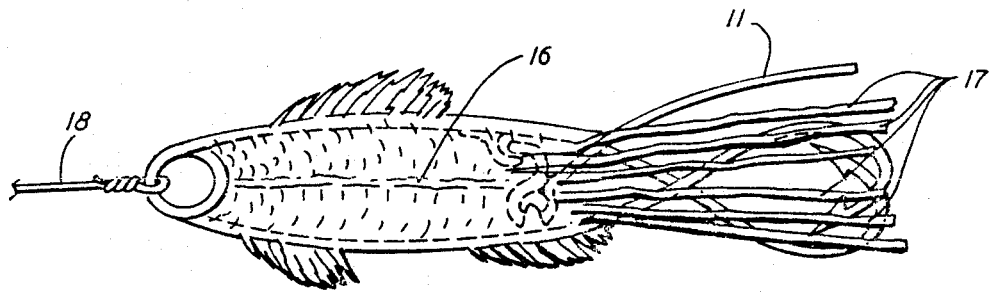
FIG. 3 is a side elevational view of the hook assembly in the flexed position, with artificial lure materials applied thereto.

An example of how the hook assembly may be incorporated in an artificial bail lure is illustrated in FIG. 3. The lure materials are arranged about and connected to legs 4 and 5, being divided along centerline 16 to allow movement of the lure materials with the spring legs between the flexed and unflexed positions. Flexible lure materials 17 extend in covering relation to hook portions 6 and 7, essentially concealing the hooks and contributing to the realistic appearance of the lure. Fishing line or leader 18 may be attached to loop 3 of the hook assembly in conventional fashion.

What is claimed is:

1. A latching, spring loaded, fish hook assembly comprising:

(a) a single strand of spring wire bent substantially at its midpoint to form a spring with first and second legs extending from said midpoint to an unflexed position wherein said legs are spaced by a substantial distance;

(b) each of said legs having a hooked end portion terminating in a barbed point, said hooked end portions curving outwardly, in the opposite direction from the other of said legs;

(c) said legs being movable against the biasing force of said spring to a flexed position wherein said legs extend from said midpoint in closely spaced relation over a first portion of their length;

(d) said legs having portions which are curved to cause said legs to cross one another at a predetermined point when in said flexed position with said hooked end portions substantially overlying one another;

(e) a trigger arm pivotally attached to said first leg for loosely pivoting movement with respect thereto;

(f) a catch attached to said second leg at a position adjacent the pivotal attachment of said trigger arm to said first leg when said legs are in said flexed position;

(g) a latch member attached to said trigger arm and extending on the opposite side of said pivotal attachment for engagement with said catch to releasably hold said legs in said flexed position with said trigger arm extending from said pivotal attachment to cross said second leg to a terminal portion outwardly adjacent said hooked end portion on said first leg, whereby movement of said terminal portion of said trigger arm toward said first leg rotates said trigger arm to release said latch from said catch allowing movement of said arms to said unflexed position thereof;

(h) said trigger arm extending in substantially parallel relation with said first leg between said pivotal attachment of said trigger arm and first leg and said terminal portion of said trigger arm when said legs are in said fixed position and said latch member is engaged with said catch.

2. The fish hook assembly of claim 1 wherein said wire is bent at its midpoint in a complete loop to form a safety-pin type spring.

3. The fish hook assembly of claim 2 wherein said latch member is integrally formed with said trigger arm.

4. The fish hook assembly of claim 1 and further including artificial lure means arranged in covering relation to at least a major portion of said legs in said flexed position thereof.

* * * * *